(12) United States Patent
Ono et al.

(10) Patent No.: US 7,096,984 B2
(45) Date of Patent: Aug. 29, 2006

(54) ELECTRIC VEHICLE

(75) Inventors: Tomohiro Ono, Shizuoka (JP); Junji Terada, Shizuoka (JP); Atsushi Kurosawa, Shizuoka (JP); Hiroaki Yagi, Shizuoka (JP); Koushi Sasaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 298 days.

(21) Appl. No.: 10/680,985

(22) Filed: Oct. 7, 2003

(65) Prior Publication Data

US 2004/0069549 A1   Apr. 15, 2004

(30) Foreign Application Priority Data

Oct. 11, 2002  (JP)  ............................. 2002-299506
Oct. 29, 2002  (JP)  ............................. 2002-314629

(51) Int. Cl.
*B60K 6/04*  (2006.01)

(52) U.S. Cl. ..................... 180/65.1; 180/65.8
(58) Field of Classification Search ............... 180/65.1, 180/65.2, 65.8, 220
See application file for complete search history.

(56) References Cited

U.S. PATENT DOCUMENTS 3,993,154 A * 11/1976 Simmons et al. ........... 180/316
5,588,498 A * 12/1996 Kitada ........................ 180/65.4
5,941,328 A *  8/1999 Lyons et al. ................ 180/65.1
5,966,000 A * 10/1999 Yang ............................ 322/23
6,158,537 A * 12/2000 Nonobe ..................... 180/65.3
6,757,597 B1 *  6/2004 Yakes et al. .................. 701/22
6,792,341 B1 *  9/2004 Hunt et al. ................... 701/22
6,795,756 B1 *  9/2004 Zhang et al. ................. 701/22
6,889,126 B1 *  5/2005 Komiyama et al. .......... 701/22

FOREIGN PATENT DOCUMENTS

JP   11-089011   3/1999
JP   11-266510   9/1999

* cited by examiner

*Primary Examiner*—Christopher P. Ellis
*Assistant Examiner*—Bridget Avery
(74) *Attorney, Agent, or Firm*—Hogan & Hartson LLP

(57) ABSTRACT

An electric vehicle includes a motor, a first controller that controls the motor, a chargeable battery supplying electric power to the motor, a second controller connected to the battery that controls electric charge for the battery and electric discharge from the battery and a first communication path that communicates between the first controller and the second controller. The first and the second controllers each includes a mutual actuating unit for actuating the other controller via the first communication path in response to actuation of the first or second controller.

13 Claims, 8 Drawing Sheets

Fig. 5

|  | BATTERY CHARGER CONNECTED | MAIN SW ON | TRAVEL | CHARGE | AUXILIARY EQUIPMENT | |
|---|---|---|---|---|---|---|
| STOP | 0 | 0 | × | × | × | ← C1 |
| TRAVEL | 0 | 1 | O | × | O | ← C2 |
| BATTERY CHARGE PRIORITIZED | 1 | 1 | × | O | × | ← C3 |
| CHARGE | 1 | 0 | × | O | × | ← C4 |

(a)

(b)

ELECTRIC VEHICLE

BACKGROUND OF THE INVENTION

1. Field of the Invention

The present invention relates to an electric vehicle in which wheels are driven by a motor supplied with power from a battery.

2. Description of Related Art

In recent years, there is growing interest in electric vehicles such as electric motorcycles and the like in which wheels are driven by a motor supplied with power from a battery due to global environment problems and traffic environment problems.

Since the electric vehicle is supplied with power from a battery, the battery capacity (electric capacity) is reduced by electric discharge based on the usage of the battery.

Therefore, the battery capacity is replenished by connecting a battery charger to the battery, and charging the battery by the battery charger.

Therefore, it is important to control the charging and discharging state of the battery. Therefore, the electric vehicle is provided with a controller for battery management for controlling the charging and discharging state of the battery (battery management controller; BMC) separately in addition to a controller for controlling the motor.

Conventionally, the electric vehicles are provided with a plurality of controllers including a controller for motor control and a controller for battery management.

In the conventional electric vehicles, actuating relation among the plurality of controllers is not clearly determined, and the setting depending on the construction of the electric vehicle has been required.

In view of such circumstances, an advantage of the present invention is to provide an electric vehicle provided with a plurality of controllers such as a controller for motor control and a controller for battery management, in which actuating relation among the plurality of controllers can be set according to the construction of the electric vehicle.

SUMMARY OF THE INVENTION

In order to achieve the advantage described above, a first aspect of the present invention includes a motor, a first controller for controlling the motor, a battery being chargeable and supplying electric power to the motor, a second controller connected to the battery for controlling electric charge for the battery and electric discharge from the battery, and a first communication path for communication between the first controller and the second controller. The first and the second controllers each include a mutual actuating unit for actuating the other controller via the first communication path in response to actuation of its own controller.

In order to achieve the advantage described above, a second aspect of the present invention includes a motor, a first controller for controlling the motor, a battery being chargeable and supplying electric power to the motor, a second controller connected to the battery for controlling electric charge for the battery and electric discharge from the battery, and a first communication path for communication between the first controller and the second controller. The first controller includes a first power source for actuating and stopping the controller itself and a first power source control circuit for turning ON and OFF the power source. The first communication path includes a first path for connecting the second controller and the first power source control circuit. The second controller transmits an activation signal to the first power source control circuit via the first passage when electric charging to the battery is started in a state in which the first controller is not activated. The first controller is adapted to start by a turning-ON operation of the first power source by the first power source control circuit in response to the transmitted activation signal.

The second aspect of the present invention includes a battery charger, which can be brought into and out of electrical contact with the battery and the second controller, for charging the battery in the state of being electrically connected to the battery and the second controller. The battery charger includes a third controller for controlling an output current and/or an output voltage during charging operation of the battery charger and a second communication path for communicating the second controller and the third controller. The second controller includes a second power source for actuating and stopping the controller itself and a second power source control circuit for turning ON and OFF the second power source. The second communication path includes a second path for connecting the third controller and the second power source control circuit. The third controller transmits an activation signal to the second power source control circuit via the second path when the battery charger is electrically connected to the battery in a state in which the second controller is not activated. The second controller is actuated by a turning-ON operation of the second power source by the second power source control circuit in response to the transmitted activation signal.

In the second aspect of the present invention, the third controller transmits a stop signal to the second power source control circuit via the second path when the battery charger is electrically disconnected from the battery when the first and the second controllers are activated. The second controller stops activating by a turning-OFF operation of the second power source by the second power source control circuit in response to the transmitted stop signal. The first power source control circuit turns OFF the first power source in response to the stopping of the activation of the second controller and/or an activation stopping signal transmitted from the second controller. The first controller stops activation by the turning-OFF operation of the first power source.

The second aspect of the present invention includes a display unit for displaying the charged state of the battery, a fourth controller for controlling the displaying mode of the display unit, and a third communication path for communicating between the first controller and the fourth controller. The fourth controller includes a third power source for activating and stopping the controller itself and a third power source control circuit for turning ON and OFF the third power source. The third communication path includes a third path for connecting the first controller and the third power source control circuit, wherein the first controller transmits an activation signal to the third power source control circuit via the third path in response to the activation of the controller itself in a state in which the fourth controller is not activated. The fourth controller is activated by a turning-ON operation of the third power source by the third power source control circuit in response to the transmitted activation signal.

In the second aspect of the present invention, the first communication path includes a fourth path for connecting the first controller and the second power source control circuit. The first controller transmits the activation signal to the second power source control circuit via the fourth path in response to activation of itself in a state in which the second controller is not activated, and the second controller is activated by a turning-ON operation of the second power source by the second power source control circuit in response to the transmitted activation signal.

In the second aspect of the present invention, the first path is a common path through which a signal indicating information on the vehicle and the battery passes together with the activation signal.

The second aspect of the present invention further includes a main switch connected to the first controller and capable of being turned ON and OFF, and the first controller is activated by a turning-ON operation of the main switch and stops operation by turning-OFF operation of the main switch.

The second aspect of the present invention includes the main switch connected to the first controller and capable of being turned ON and OFF. The first controller is activated by a turning ON operation of the main switch, the activated first controller transmits an activation signal to the second power control circuit via the fourth path. The second controller is activated by a turning ON operation of the second power source by the second power source control circuit in response to the transmitted activation signal. The first controller shifts the operation mode of the controller itself to a charging mode when the battery charger is electrically connected to the battery with the main switch turned ON and stops operation when the battery charger is electrically disconnected from the battery.

BRIEF DESCRIPTION OF DRAWINGS

FIG. 5 is an explanatory drawing showing a controlling state with a battery charger connected.

DETAILED DESCRIPTION OF THE PREFERRED EMBODIMENTS

As an electric vehicle according to the present invention, in particular, an embodiment of the electric motorcycle will be described, referring to attached drawings.

Figure 1:
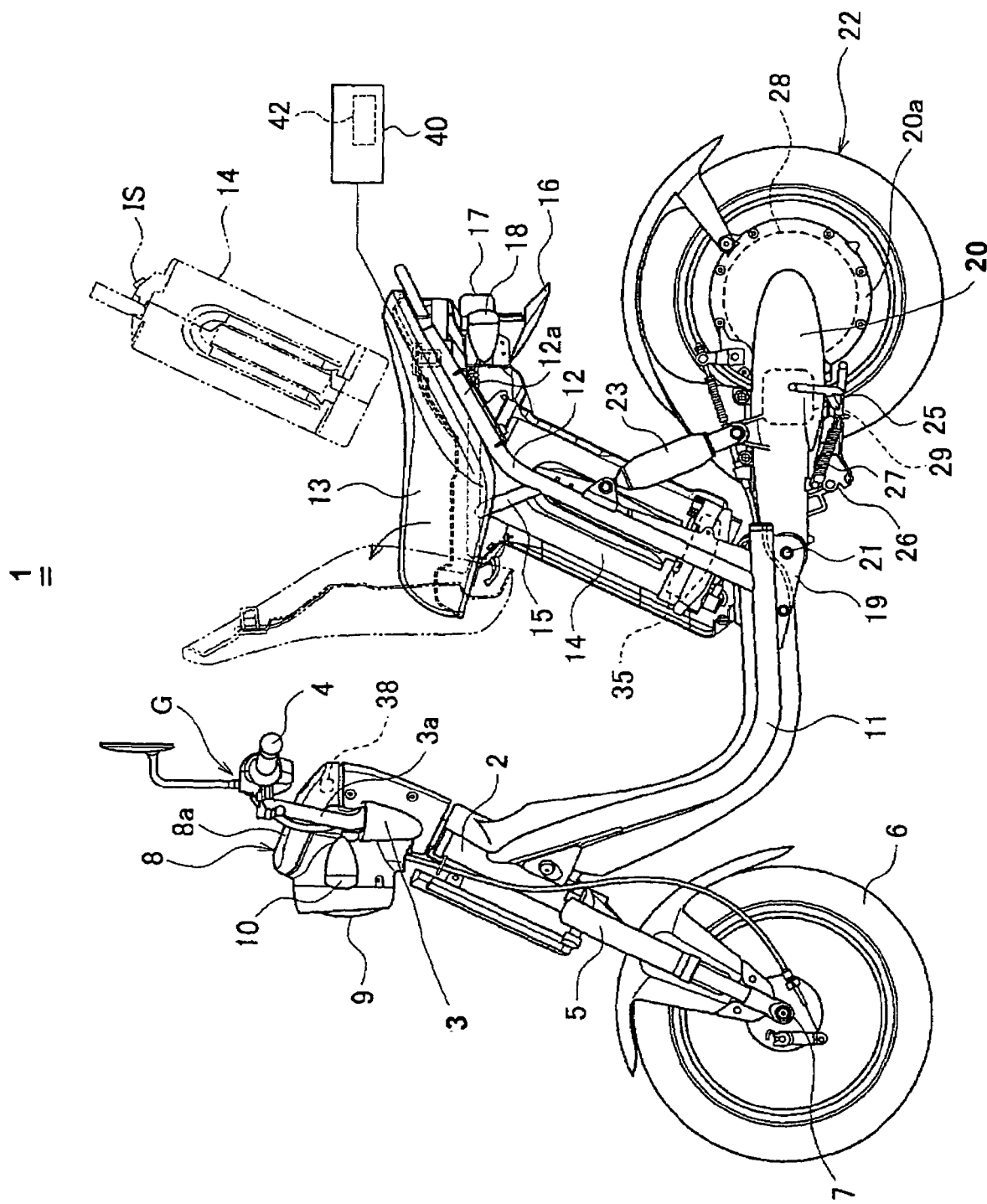
FIG. 1 is a side view of an electric motorcycle according to an embodiment of the present invention, showing an example of an apparatus on which an axial gap type dynamo-electric machine is mounted.
Figure 2:
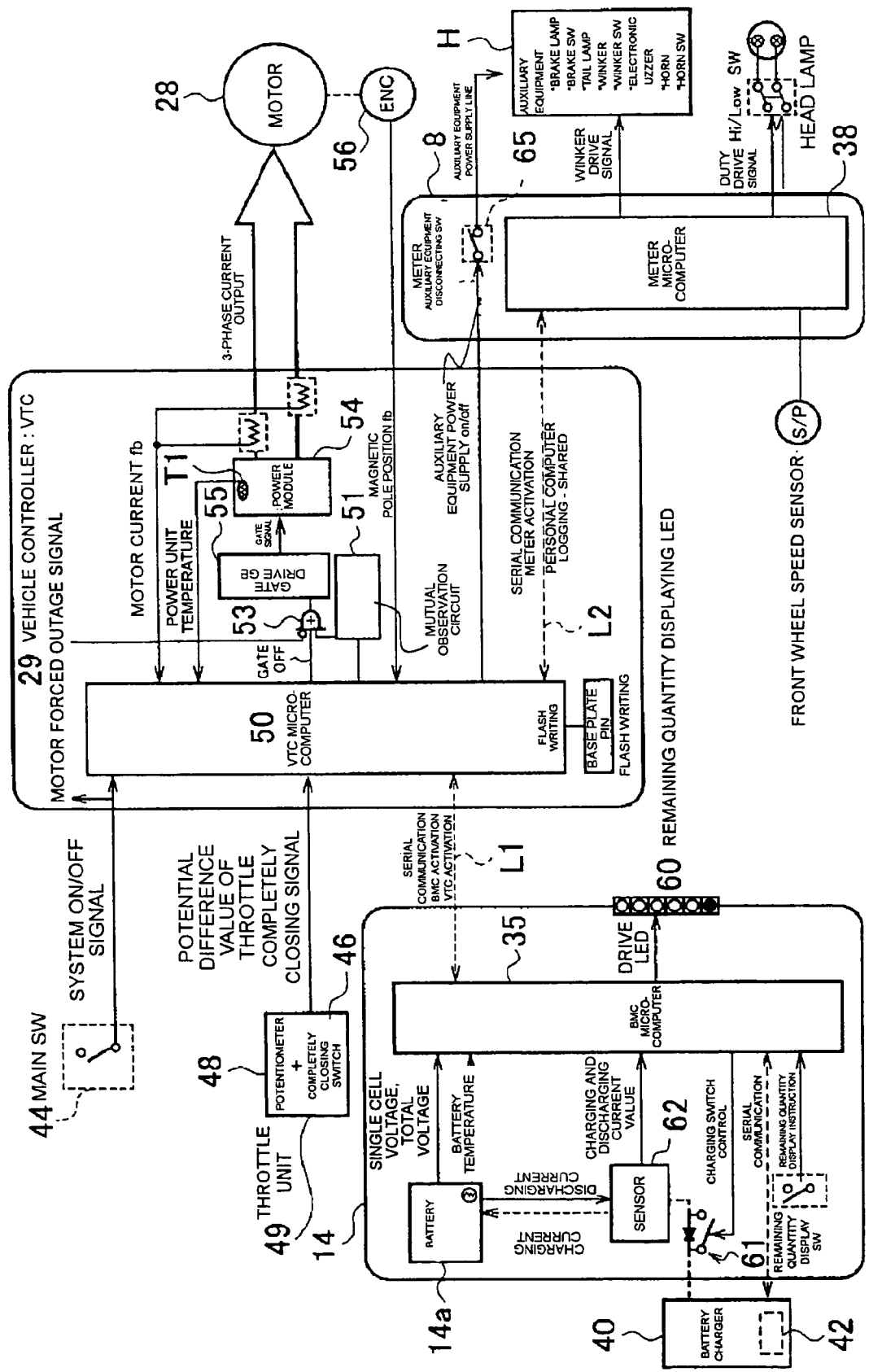
FIG. 2 is a block diagram of an electric system of the motorcycle shown in FIG. 1.

FIG. 1 is a side view of an electric motorcycle 1 according to an embodiment of the present invention, and FIG. 2 is a block diagram of an electric system of the electric motorcycle 1.

As shown in FIG. 1 and FIG. 2, the electric motorcycle 1 includes a head pipe 2 at the upper front portion of a vehicle body thereof, and a steering shaft, not shown, for changing the direction of the vehicle body. The steering shaft is rotatably inserted through the head pipe. A handle supporting member 3 to which a handle 3*a* is fixed is mounted at the upper end of the steering shaft, and a grip 4 is mounted to both ends of the handle 3*a*. A grip G on the right side not shown (far side in FIG. 1) constitutes a rotatable throttle grip.

A pair of left and right front forks 5 are mounted so as to extend downwardly of the lower end of the head pipe 2. A front wheel 6 is attached to the lower ends of the front forks 5 via the front axle 7, and the front wheel 6 is rotatably supported by the front axle 7 in a state of being suspended so as to be dumped by the front forks 5.

A display control unit 8 including a meter 8*a* integrally provided with a display unit formed, for example, of liquid crystal for displaying the charged state of a battery, the traveling state of the electric motorcycle 1, the traveling mode, and so on, which will be described later, an alarm output unit for supplying an alarm sound (electronic buzzer or the like), and an input unit including a plurality of switches (three switches, for example) for entering information such as values or characters is disposed forwardly of the handle 3*a* of the handle supporting member 3. A head lamp 9, which is auxiliary equipment (including lamps, alarms, and switches for controlling the same) H is fixed to the handle supporting member 3 at the position downwardly of the meter 8*a*. Flasher lamps 10, which are auxiliary equipments H (only one of them is shown in FIG. 1), are provided on both sides of the head lamp 9, respectively.

A pair of left and right vehicle body frames 11 substantially L-shaped as viewed from the side, extend from the head pipe 2 toward the rear of the vehicle body. The vehicle body frames 11 are shaped like a round pipe, and extend obliquely downward from the head pipe 2 toward the rear of the vehicle body, and then extend horizontally toward the rear to be shaped substantially like the letter L viewed from the side.

A pair of left and right seat rails 12 extend from the rear side ends of the pair of vehicle body frames 11 obliquely upward toward the rear, and rear ends 12*a* of the seat rails 12 are bent toward the rear along the shape of a seat 13.

A battery box 14 is detachably disposed between the pair of left and right seat rails 12 (the removed state is shown by chain double-dashed lines in FIG. 1), and a plurality of rechargeable batteries (secondary battery; for example, a lithium ion battery) 14*a* are stored in the battery box 14.

A seat stay 15 formed in an inverted U-shape, is welded to the pair of left and right seat rails 12 in the vicinity of the bent portions so as to be inclined upward toward the front of the vehicle body, and the seat 13 is disposed in a portion enclosed by the seat stay 15 and the left and the right seat rails 12 so as to be capable of opening and closing, that is, the front end of the seat stay 15 is capable of rotating in the vertical direction.

A rear fender 16 is attached to the rear end of the seat rail 12, and a tail lamp 17, which is part of auxiliary equipment H, is mounted to the rear surface of the rear fender 16. In addition, flash lamps, which are part of auxiliary equipment H, (only one of them is shown in FIG. 1) 18 are attached to the left side and the right side of the tail lamp 17.

On the other hand, rear arm brackets 19 (only one of them is shown in FIG. 1) are welded to the horizontal portion of the pair of left and right vehicle body frames 11 below the seat 13, and the front end of a rear arm 20 is pivotably supported by a pair of left and right rear arm brackets 19 via a pivot shaft 21. A rear wheel 22, which corresponds to a drive wheel, is rotatably supported at a rear end 20*a* of the rear arm 20, and the rear arm 20 and the rear wheel 22 are suspended by a rear cushion 23 so as to absorb impact.

A side stand 25 is rotatably supported by the rear arm 20 on the left side via a shaft 26 on the rear side of the horizontal portions of the pair of left and right vehicle body frames 11, and the side stand 25 is urged by a return spring 27 in the closing direction.

An axial gap type electric vehicle 28 connected to the rear wheel 22 for rotating the rear wheel 22 (hereinafter may be referred to simply as electric vehicle 28), and a vehicle controller (hereinafter, may be also referred to as VTC) 29 electrically connected to the electric vehicle 28 for driving the electric vehicle 28 are mounted at the portion between the rear ends 20*a* of the rear arms 20.

As shown in FIG. 1 and FIG. 2, a BMC microcomputer 35, which is a battery management controller, connected to the battery 14*a* for managing electric charge to the battery 14*a* and electric discharge from the battery 14*a* is provided in the battery box 14.

The display control unit 8 is, as shown in FIG. 1 and FIG. 2, provided with a meter microcomputer 38 for controlling the display mode of the display unit of the meter 8*a* and driving of the auxiliary equipment H.

On the other hand, the BMC microcomputer 35 in the battery box 14 is constructed in such a manner that a connector of the battery charger 40 can be attached to and detached from (can be brought into and out of electrical contact with the microcomputer 35) a connector electrically connected to the battery 14*a* and the BMC microcomputer 35 via an insertion port IS for electric charge. The battery charger 40 is capable of charging the battery 14*a* under the control of the BMC microcomputer 35 in a state of being electrically connected to the battery 14*a* and the BMC microcomputer 35 (in a state in which the connector of the battery charger 40 is attached to the connector which is connected to the BMC microcomputer 35).

The battery charger 40 is provided with a battery charger controller (hereinafter, referred to as battery charger microcomputer) 42 for controlling the output current and/or the output voltage during the charging operation by the battery charger 40 (the charging section thereof, as shown in FIG. 1 and FIG. 2.

In addition, as shown in FIG. 2, a main switch 44 for turning the VTC 29 ON/OFF by operation of the driver is provided in the vicinity of the meter 8*a*.

On the other hand, the throttle grip G is rotatable about the axis thereof, and the throttle grip G is provided therein with a completely closing switch 46 for transmitting a completely closing signal to the VTC 29 by turning the switch ON when it is rotated to the completely closed position. There is also provided a potentiometer 48 connected to the throttle grip G with a wire for detecting the amount of rotation based on the rotation of the throttle grip G and transmitting the result as a potential difference value of throttle to the VTC 29. The completely closing switch 46 and the potentiometer 48 constitute a throttle unit 49.

The VTC 29 is, as shown in FIG. 2, provide with a microcomputer 50.

The VTC microcomputer 50 can communicate with the BMC microcomputer 35 via a first communication path L1 for two systems (for transmitting and receiving); fixed line and/or wireless, and the VTC microcomputer 50 can communicate with the meter microcomputer 38 via a second communication path L2 of two systems; fixed line and/or wireless.

In other words, in the present embodiment, the BMC microcomputer 35 and the meter microcomputer 38 are connected in series by the first communication path L1 and the second communication path L2 with the VTC microcomputer 50 interposed therebetween.

The first communication path L1 is a path between the BMC microcomputer 35 and the VTC microcomputer 50, though which signals indicating information on vehicle control or the state of the battery, are communicated (transmitted and received), and the second communication path L2 is a path between the VTC microcomputer 50 and the meter microcomputer 38, through which signals indicating information, such as vehicle control or the state of the battery, are communicated (transmitted and received).

The VTC 29 is also connected to the VTC microcomputer 50, and is provided with a mutual observation circuit 51 for observing the operating state of the VTC microcomputer 50. The VTC microcomputer 50 has a function to observe the operating state of the mutual observation circuit 51.

In addition, the VTC 29 is provided with a logical output unit 53 for supplying a logical signal based on a switching signal of the main switch 44, a control signal of the VTC microcomputer 50, and an observation signal from the mutual observation circuit 51.

The VTC 29 is provided with a power module 54 including an inverter for supplying three-phase current to the motor 28 and rotating the motor 28, and a gate drive 55 for controlling a gate signal for driving the inverter of the power module 54 and controlling the number of revolution of the motor 28 through the power module 54.

The gate drive 55 is connected to the logical output unit 53 so as to actuate when the logical output of the logical output unit 53 is at a High level, and stop operation when it is at a Low level (High level>Low level).

ACT is a current sensor for detecting three-phase current output from the power module 54 and feeding the result back to the VTC microcomputer 50, and the power module 54 is provided therein with a temperature sensor T1 for detecting the temperature of the power unit in the power module 54.

On the other hand, the motor 28 is provided with an encoder (ENC) 56 for detecting the number of revolution of the motor 28, and the output of the number of revolution of the encoder 56 is fed back to the VTC microcomputer 50.

Then the battery box 14 includes, as shown in FIG. 2, a remaining quantity display LED 60 mounted to one surface thereof as a meter for displaying the remaining quantity of the battery 14*a* in response to the drive signal from the BMC microcomputer 35, an electric charge switch 61 connected to the battery charger 40 when the battery box 14*a* is mounted for controlling ON/OFF of a charging operation of the battery charger 40 in response to a control signal from the BMC microcomputer 35, and a sensor 62 connected to the battery 14*a* and also connected to the battery charger 40 when the battery box 14*a* is mounted. The sensor 62 is constructed to detect a charging current supplied (outputted) to the battery 14*a* from the battery charger 40 and a discharging current discharged (including discharge during travel of the vehicle and natural self-discharge) from the battery 14*a*. The detected values of the charging and discharging current are transmitted to the BMC microcomputer 35.

The voltage of each battery (single cell) of the rechargeable batteries 14*a* or the total voltage is transmitted to the BMC microcomputer 35 respectively, and the temperature in the battery 14a is transmitted to the BMC microcomputer 35 via a thermistor.

On the other hand, a meter microcomputer 38 is connected to the VTC 29 via the second communication path L2, and is provided with an auxiliary equipment disconnecting switch 65 connected to the auxiliary equipment H via an auxiliary equipment power supply line. The auxiliary equipment disconnecting switch 65 can turn ON and OFF the power supply to the auxiliary equipment H.

The VTC microcomputer 50 is connected to the battery 14a without the intermediation of the BMC microcomputer 35, so that the voltage of the battery 14a can be detected.

Figure 3:
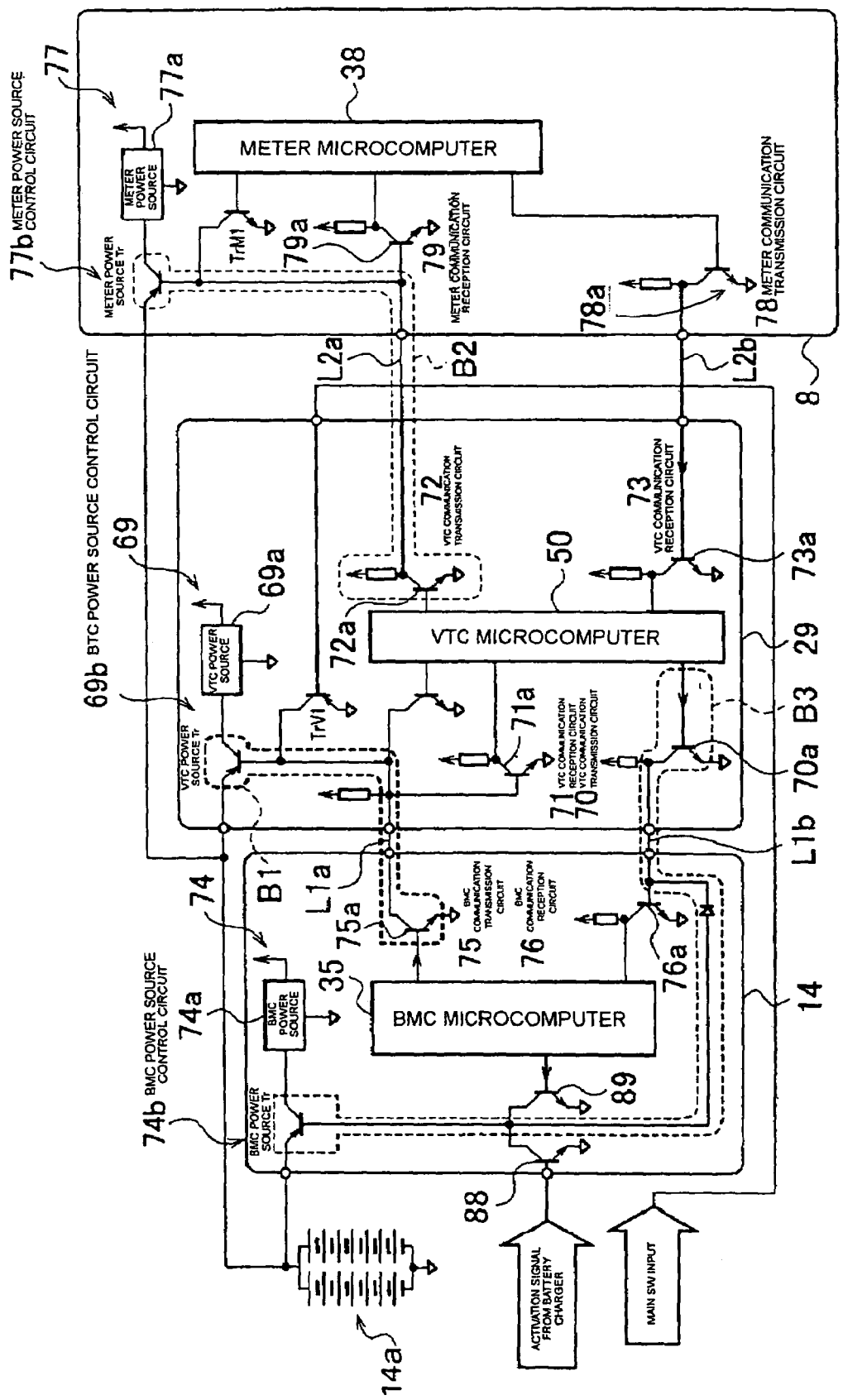
FIG. 3 is a drawing showing the construction of the circuit relating to the mutual activation among the VTC microcomputer, the BMC microcomputer, and the meter microcomputer, which are not shown in FIG. 2.

FIG. 3 is a drawing showing the construction of the circuit relating to the mutual activation among the VTC microcomputer 50, the BMC microcomputer 35, and the meter microcomputer 38, which are not shown in FIG. 2.

In other words, as shown in FIG. 3, the VTC 29 is provided with a VTC power supply circuit 69, a VTC communication transmission circuit 70, and a VTC communication reception circuit 71, and is connected to the BMC microcomputer 35 via the VTC communication transmission circuit 70, the VTC communication reception circuit 71, and the communication path L1. The VTC microcomputer 50 is provided with a VTC communication transmission circuit 72 and a VTC communication reception circuit 73, and is connected to the meter microcomputer 38 via the VTC communication transmission circuit 72, the VTC communication reception circuit 73 and the communication path L2.

The VTC power supply circuit 69 includes a VTC power source 69a for supplying a power for operating the VTC 29 and the VTC microcomputer 50, and a VTC power source control circuit 69b for turning ON and OFF the VTC power source 69a. The VTC power source control circuit 69b is provided with a VTC power source transistor (Tr). The collector terminal of the VTC power source Tr is connected to the VTC power source 69a, and the base terminal is connected to one system (L1a) of the first communication path L1.

The VTC communication transmission circuit 70 is provided with a transmission transistor (Tr) 70a, and a base terminal of the transmission Tr 70a is connected to the VTC microcomputer 50, and a collector terminal is connected to the other system L1b of the first communication path L1.

The VTC communication reception circuit 71 is provided with a reception transistor (Tr) 71a, and a collector terminal of the reception (Tr) 71a is connected to the VTC microcomputer 50. A base terminal of the reception (Tr) 71a is connected to a line which connects the base terminals of the first communication path L1a and the VTC power source Tr.

The VTC communication transmission circuit 72 is provided with a transmission transistor (Tr) 72a and a base terminal of the transmission Tr 72a is connected to the VTC microcomputer 50, and a collector terminal is connected to one of the systems L2a of the second communication path L2. The VTC communication reception circuit 73 is provided with a reception transistor (Tr) 73a, and a collector terminal of the reception Tr 73a is connected to the VTC microcomputer 50. A base terminal of the reception Tr 73a is connected to the other system L2b of the second communication path L2.

The battery box 14 is provided with a BMC power source circuit 74, a BMC communication transmission circuit 75, and a BMC communication reception circuit 76, and is connected to the VTC microcomputer 50 via the BMC communication transmission circuit 75, the BMC transmission reception circuit 76, and the communication path L1.

The BMC power source circuit 74 is provided with a BMC power source 74a for supplying power for operating the BMC microcomputer 35, and a BMC power source control circuit 74b for turning ON and OFF the BMC power source 74a. The BMC power source control circuit 74b is provided with a BMC power source transistor (Tr). A collector terminal of the BMC power source Tr is connected to the BMC power source 74a, and a base terminal is connected to the first communication path L1b.

The BMC communication transmission circuit 75 is provided with a transmission transistor (Tr) 75a, and a base terminal of the transmission Tr 75a is connected to the BMC microcomputer 35, and a collector terminal is connected to the first communication path L1a.

The BMC communication reception circuit 76 is provided with a reception transistor (Tr) 76a, and a collector terminal of the reception Tr 76a is connected to the BMC microcomputer 35. A base terminal of the reception Tr 76a is connected to the first communication path L1b.

The display control unit 8 is provided with a meter power source circuit 77, a meter communication transmission circuit 78, and a meter communication reception circuit 79, and is connected to the VTC microcomputer 50 via the meter communication transmission circuit 78, the meter communication reception circuit 79, and the second communication path L2a.

The meter power circuit 77 includes a meter power source 77a for supplying power for operating the meter microcomputer 38, and a meter power source control circuit 77b for turning ON and OFF the meter power source 77a. The meter power source control circuit 77b is provided with a meter power source transistor (Tr). A collector terminal of the meter power source Tr is connected to the meter power source 77a, and a base terminal is connected to the second communication path L2a.

The meter communication transmission circuit 78 is provided with a transmission transistor (Tr) 78a and a base terminal of the transmission Tr 78a is connected to the BMC microcomputer 35, and a collector terminal is connected to the second communication path L2b.

The meter communication reception circuit 79 is provided a reception transistor (Tr) 79a, and a collector terminal of the reception Tr 79a is connected to the meter microcomputer 38. A base terminal of the reception Tr 79a is connected to the second communication path L2a.

The battery 14a is connected to an emitter terminal of the BMC power source transistor Tr in the battery box 14, an emitter terminal of the VTC power source Tr in the VTC 29, and an emitter terminal of the meter power source Tr of the display control unit 8.

On the other hand, a collector terminal of a transistor (Tr) 88 and a collector terminal of a transistor (Tr) 89 are connected to predetermined midpoints of a line which connects the first communication path L1b and the base terminal of the BMC power source Tr, respectively, so that an activation signal is transmitted from the battery charger 40 to the base terminal of Tr 88. A base terminal of the Tr 89 is connected to the BMC microcomputer 35, so that a self-activation signal from the BMC microcomputer 35 can be transmitted to the base terminal of the BMC power source transistor Tr via the Tr 89.

A collector terminal of a transistor (Tr) V1 is connected to the base terminal of the VTC power source Tr, so that ON/OFF signals from the main switch 44 are input to the base terminal, and the VTC power source transistor Tr can be activated/stopped in response to the ON/OFF signals. In FIG. 3, a base terminal of a transistor (Tr) M1 is connected to the meter microcomputer 38, and a collector terminal is connected to a base terminal of the meter power source Tr, so that a self-activation signal from the meter microcomputer 38 can be supplied to the base terminal of the meter power source transistor Tr.

Subsequently, referring to FIG. 3, the mutual activation/stop operation among the VTC microcomputer 50, the BMC microcomputer 35, and the meter microcomputer 38 in the electric motorcycle 1 according to the present embodiment will be described.

(1) Mutual activation when starting electric charge to the battery 14a of the battery charger 40/stop operation when charging to the battery 14a of the battery charger 40 has finished:

When the connector of the battery charger 40 is inserted into a connector which is connected to the BMC microcomputer 35 on the side of the battery 14a via the insertion port IS for electric charging, and thus the battery charger 40 is electrically connected to the battery 14a and the BMC microcomputer 35, electric charging from the battery charger 40 to the battery 14a starts.

In this case, the battery charger microcomputer 42 of the battery charger 40 transmits an activation signal to a gate terminal of the transistor 88 in the battery box 14. As a consequence, the transistor 88 is turned ON and, as a result of turning ON of the transistor 88, the BMC power source Tr is turned ON. Consequently, the voltage signal of the battery 14a is supplied to the BMC power source 74a via the emitter terminal of the BMC power source Tr, and the BMC microcomputer 35 is activated by the BMC power source 74a.

The activated BMC microcomputer 35 turns the transmission transistor 75a of the BMC communication transmission circuit 75 ON as shown by broken lines B1 in the drawing and, as a consequence of turning ON of the transmission transistor 75a, a signal is transmitted to a gate terminal of the VTC power source Tr, and thus the VTC power source Tr is turned ON. Consequently, a voltage signal of the battery 14a is supplied to the VTC power source 69a via the emitter terminal of the VTC power source Tr, and the VTC microcomputer 50 is activated by the VTC power source 69a.

The activated VTC microcomputer 50 turns the transmission transistor 72a of the VTC communication transmission circuit 72 ON, as shown by broken lines B2 in the drawing and, as a consequence of turning ON of the transmission transistor 72a, the meter power source Tr is turned ON. Consequently, a voltage signal of the battery 14a is supplied to the meter power source 77a via the emitter terminal of the meter power source Tr, and the meter microcomputer 38 is activated by the meter power source 77a.

In other wards, according to this arrangement, the BMC microcomputer 35, the VTC microcomputer 50, and the meter microcomputer 38 can be activated automatically in sequence in response to starting electric charge to the battery 14a of the battery charger 40.

On the other hand, when the electric charge from the battery charger 40 to the battery 14a finishes and the connector of the battery charger 40 is pulled out from the connector on the side of the BMC microcomputer 35 via the insertion port IS for electric charge (when the battery charger 40 is electrically disconnected from the battery 14a and the BMC microcomputer 35), as shown by broken lines B1 in the figure, the transmission transistor 75a of the BMC communication transmission circuit 75 is turned OFF (activation stop signal from the BMC microcomputer 35 (disconnection signal)) or a signal from the BMC microcomputer 35 to the gate terminal of the VTC power source Tr does not exist any more. Consequently, the VTC power source Tr is turned OFF, and supply of the voltage signal of the battery 14a to the VTC power source 69a is blocked off, so that the operation of the VTC microcomputer 50 stops.

As a result of stopping the operation of the VTC microcomputer 50, the transmission transistor 72a of the VTC communication transmission circuit 72 is turned OFF and thus the meter power source Tr is turned OFF. Consequently, supply of the voltage signal of the battery 14a to the meter power source 77a is blocked off, and thus the operation of the meter microcomputer 38 stops.

On the other hand, the BMC microcomputer 35 turns the transistor 89 OFF, then turns the BMC power source Tr OFF, and then turns the BMC power source 74a, which is the power source itself, OFF to stop operation thereof.

As described above, in this arrangement, the operation of the VTC microcomputer 50, the meter microcomputer 38, and the BMC microcomputer 35 can stop automatically, respectively, (the system of the electric motorcycle 1 can be shut down) in response to termination of electric charge to the battery 14a of the battery charger 40 (electrical disconnection of the battery charger 40 from the battery 14a).

(2) Mutual activation when the main switch 44 is turned ON/stop operation when turned OFF:

When the driver turned the main switch 44 ON, the ON signal is transmitted to a transistor TrV1, and the transistor V1 is turned ON.

By turning the transistor V1 ON, the VTC power source Tr is turned ON, and consequently, a voltage signal of the battery 14a is supplied to the VTC power source 86 via the VTC power source Tr, and the VTC microcomputer 50 is activated by the VTC power source 69a.

The activated VTC microcomputer 50 turns the transmission transistor 70a in the VTC communication transmission circuit 70 ON, as shown by broken lines B3 in the drawing, and thus the transistor 76a of the BMC communication reception circuit 76 is turned ON. Consequently, a current flows from the BMC power source Tr through a diode D to the transistor 76a, and the BMC power source Tr is turned ON. As a consequence, a voltage signal of the battery 14a is supplied through the BMC power source Tr to the BMC power source 74a, and the BMC microcomputer 35 is activated by the BMC power source 74a.

Activation of the meter microcomputer 38 is the same as the path shown by broken lines B2.

In other words, according to this arrangement, it is possible to activate the VTC microcomputer 50 in advance by turning the main switch 44 ON, and then activating the BMC microcomputer 35 and the meter microcomputer 38 by the VTC microcomputer 50.

In a state in which the main switch is turned ON, when the connector of the battery charger 40 is inserted into the connector connected to the BMC microcomputer 35 on the side of the battery 14a via the insertion port IS for electric charge, and the battery charger 40 is electrically connected to the battery 14a and the BMC microcomputer 35, electric charge from the battery charger 40 to the battery 14a is started, and the VTC microcomputer 50 is shifted to the charging mode, which will be described later.

When the connector of the battery charger 40 is pulled out from the connector on the side of the BMC microcomputer 35 via the insertion port IS for electric charge in this charging mode (when the battery charger 40 is electrically disconnected from the battery 14a and the BMC microcomputer 35), the BMC microcomputer 35 stops operation of the VTC microcomputer 50 as described above. By stopping the operation of the VTC microcomputer 50, the operation of the meter microcomputer 38 is stopped, and the operation of the BMC microcomputer 50 itself also stops. Consequently, the operation of the entire system of the electric motorcycle 1 is stopped (shut down).

On the other hand, when the driver turns the main switch 44 OFF, the OFF signal is transmitted to the transistor V1 and the transistor V1 is turned OFF.

Consequently, the VTC power source Tr is turned OFF and supply of a voltage signal of the battery 14a to the VTC power source 69a is blocked off, and the operation of the VTC microcomputer 50 stops.

By stopping the operation of the VTC microcomputer 50, the transmission transistor 70a and the transistor 76a of the BMC communication reception circuit 76 are turned OFF, respectively, and, as a consequence, the BMC power source Tr is turned OFF. Accordingly, supply of a voltage signal of the battery 14a to the BMC power source 74a is blocked off, and thus the operation of the BMC microcomputer 35 stops.

In the same manner, by stopping the operation of the VTC microcomputer 50, the transmission transistor 72a of the VTC communication transmission circuit 72 is turned OFF, and thus the meter power source Tr is turned OFF. Consequently, supply of a voltage signal of the battery 14a to the meter power source 77a is blocked off, and thus the operation of the meter microcomputer 38 stops.

In this manner, according to this arrangement, it is possible to stop the operation of the VTC microcomputer 50, the BMC microcomputer 35, and the meter microcomputer 38 respectively automatically in response to the turning-OFF operation of the main switch 44 of the driver (the system of the electric vehicle 1 can be shut down).

As described above, in this arrangement, since the first communication path L1 and the second communication path L2 for connecting the VTC microcomputer 50 and the BMC microcomputer 35, and the VTC microcomputer 50 and the meter microcomputer 38, respectively, so as to enable communication (wired/wireless) are provided, for example, when one of the BMC microcomputer 35 and the VTC microcomputer 50 is activated by connecting the battery charger 40 or by turning the main switch 44 ON, the activated microcomputer can activate the other microcomputer via the first communication path L1 in response to the activation of itself. When the operation of one of the BMC microcomputer 35 and the VTC microcomputer 50 stops in response to disconnection of the battery charger 40 or turning the main switch 44 OFF, the operation of the other microcomputer can stops via the first communication passage L1 by the previously stopped microcomputer.

Then, the meter microcomputer 38 can be activated/stopped via the second communication path L2 in response to activation/stopping the VTC microcomputer 50.

In other words, for example, in the arrangement in which the VTC microcomputer 50 activates other microcomputers (the BMC microcomputer 35, the meter microcomputer 38), respectively, it is necessary to transmit trigger signals for activation to the VTC microcomputer 50 in a concentrated manner in various scenes in which the other microcomputers are needed to be activated (for example, connection of the battery charger 40, turning ON of the main switch 44).

Therefore, in the construction in which the plurality of microcomputers (the VTC microcomputer 50, the BMC microcomputer 35, and the meter microcomputer 38) and sensors are disposed away from each other as in the case of the electric motorcycle 1, the wiring has to be made for the VTC microcomputer 50 from the position away from the VTC microcomputer 50, and the wiring may become complex.

However, in this arrangement, since the BMC microcomputer 35 and the meter microcomputer 38 are connected in series by the first communication path L1 and the second communication path L2 with the VTC microcomputer 50 interposed therebetween, the VTC microcomputer 50 and the BMC microcomputer 35 can activate/stop with respect to each other via the first communication passage L1, and the meter microcomputer 38 may be activated/stopped in response to activation/stopping of the VTC microcomputer 50. Therefore, the system of the electric motorcycle 1 can be activated/stopped with a simple construction.

In addition, according to this arrangement, since the VTC power source control circuit 69b, the BMC power source control circuit 74b, and the meter power source control circuit 77b, which are power source control circuits independently of the VTC microcomputer 50, the BMC microcomputer 35, and the meter microcomputer 38, it is not necessary to keep the respective microcomputers 50, 35, 38 in a waiting state any more. Consequently, the power consumption can be reduced, and the reliability may be improved.

According to this arrangement, the first communication path L1 between the VTC microcomputer 50 and the BMC microcomputer 35 is constructed as a shared path that can communicate the signals for mutual activation/stop together with signals indicating information on vehicle control and the state of the battery. The system construction can be simplified in comparison with the case in which the signal communication path for mutual activation is provided separately from the signal communication path showing information on the vehicle control and the state of the battery.

In addition, according to this arrangement, activation/stopping by controlling the main switch 44, and the activation/stopping in response to start/termination of electric charge can be realized in a simple construction, respectively.

Subsequently, control of the auxiliary equipment during electric charge of the battery 14a by the battery charger 40 according to the present embodiment will be described.

Figure 4:
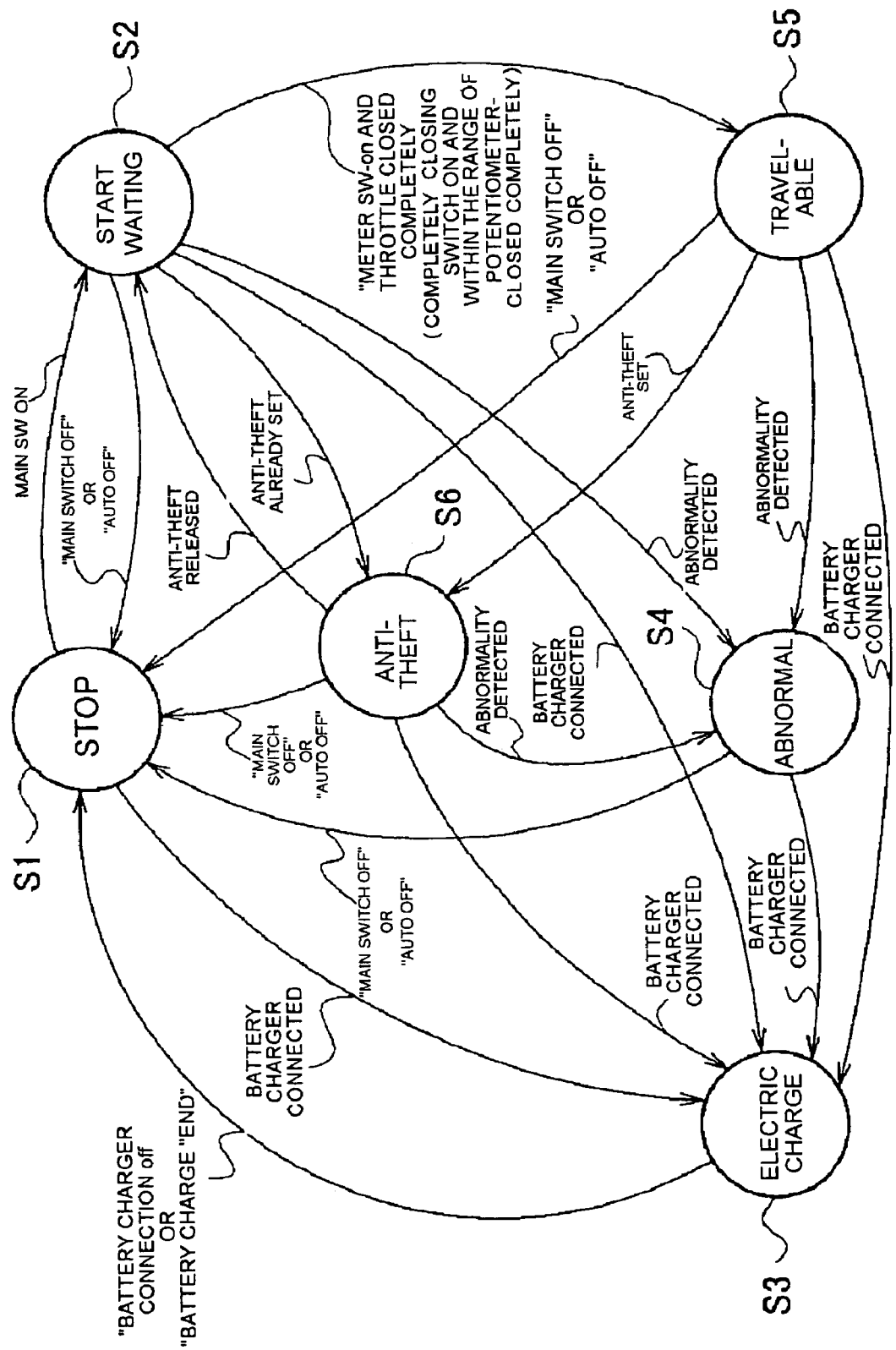
FIG. 4 is a drawing showing a state transfer in which the electric motorcycle according to the present embodiment can be transferred.

FIG. 4 is a drawing showing a state transfer in which the electric motorcycle 1 according to the present embodiment (a system composed of the VTC 29, the BMC microcomputer 35, the meter microcomputer 38, and the battery charger microcomputer 42 (during electric charge)) can be transferred.

In addition, as shown in FIG. 4, when the main switch 44 is turned ON ("1") in a state in which the motorcycle 1 stops traveling {when the main switch 44 is OFF, or in auto-OFF (a state of automatic system down transferred after a predetermined time period has elapsed in a state in which the opening of the throttle of the throttle grip G is completely closed, even when the main switch 44 is ON ("1"))} S1 (Stop Mode S1)(C1 in FIG. 5), the VTC microcomputer 50 determines whether or not the battery charger 40 is electrically connected to the BMC microcomputer 35 via the BMC microcomputer 35.

When the connecting state was not found as a result of this determination, the VTC microcomputer 50 is transferred to the state of waiting start S2 shown in FIG. 4, and then starts power supply to the auxiliary equipment H by transmitting an auxiliary-equipment-power-supply-ON signal to the auxiliary equipment disconnecting switch 65 (C2 in FIG. 5).

On the other hand, when the connecting state was detected as a result of a determination whether or not the battery charger 40 was electrically connected to the BMC microcomputer 35, the VTC microcomputer 50 stops power supply to the auxiliary equipment H by transmitting an auxiliary-equipment-power-supply-OFF signal to the auxiliary equipment disconnecting switch 65, and gives electric charge from the battery charger 40 to the battery 14a top priority (the state (charging mode) S3 in FIG. 4, C3 in FIG. 5) even when the main switch 44 is in an ON-state.

When information indicating that the battery charger 40 is connected to the BMC microcomputer 35 is transmitted from the BMC microcomputer 35 in a case in which the main switch 44 is OFF ("0"), the VTC microcomputer 50 maintains the state S3 in FIG. 4, and allows only electric charge from the battery charger 40 to the battery 14a (C4 in FIG. 5).

In other words, according to this arrangement, during electric charge of the battery 14a by the battery charger 40, the usage (electric discharge) of the battery 14a may be minimized by blocking off energization to the auxiliary equipment H, which may affect to the remaining quantity (electric discharge) of the battery 14a.

Therefore, the capacity of the battery 14a can be controlled accurately by the BMC microcomputer 35, and the battery 14a can be charged accurately.

Subsequently, ways of coping with the emergency state of the electric motorcycle 1 for the entire the motorcycle 1 according to the present embodiment will be described.

(1) Ways of Coping on the System Side (Torque Control)

In a case where part of the system detects an abnormality (for example, when the VTC microcomputer 50 detected an abnormal temperature of the power module 54 via the temperature sensor T1, or when the BMC microcomputer 35 detected an abnormal temperature of the battery 14a via the thermistor) while the electric motorcycle 1 is in the start waiting state (start waiting mode) S2 (the same in the case of a travelable state, and an anti-theft state that will be described later), the entire the electric motorcycle 1 (system) is transferred to an abnormal state S4 shown in FIG. 4.

In this case, the VTC microcomputer 50 makes torque for the motor 28 pulsate via the gate drive 55 and the power module 54 based on the current opening of the throttle transmitted from the throttle unit 49 (intermittent torque variations).

Consequently, a driver who is operating the electric motorcycle 1 can recognize that any abnormality occurred in the system of the motorcycle 1 immediately without influencing the surrounding area from its pulsating traveling state.

(2) Ways of Coping Based on the Operation by a Driver.

It is assumed that the driver operating the electric motorcycle 1 wants to stop the vehicle quickly in a certain emergency state.

Figure 6:
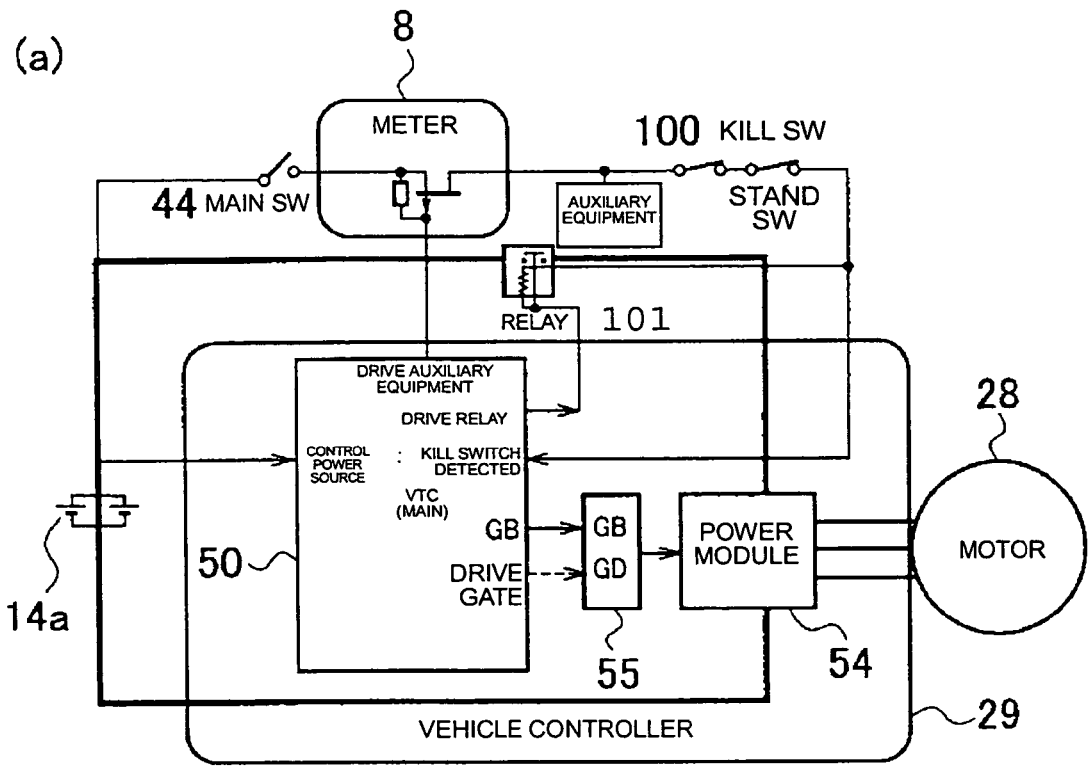
FIG. 6(*a*) is an explanatory drawing illustrating a process of blocking energization to a motor off with a relay mounted, FIG. 6(*b*) is an explanatory drawing illustrating a process of blocking energization to a motor off with no relay mounted.
Figure 6:
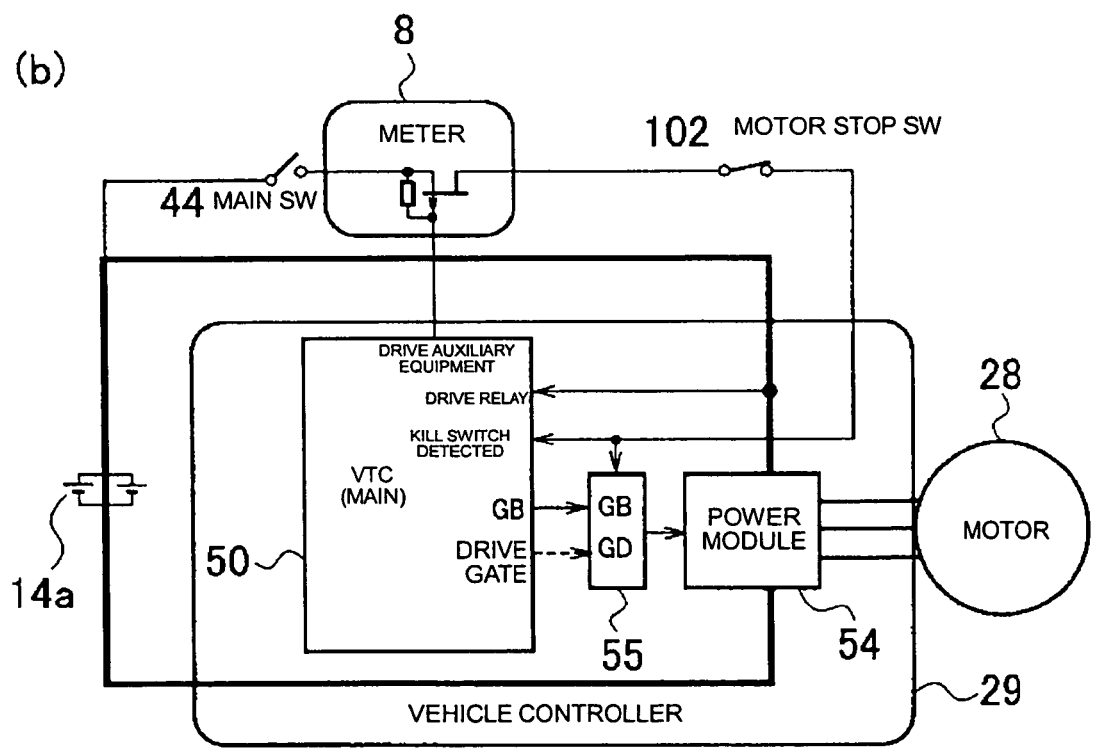

In this case, for example, when a relay 101 is mounted in the construction according to the present embodiment, as shown in FIG. 6(a), the relay 101 is actuated in response to turning-ON operation of a kill switch 100 by the driver, and thus the VTC microcomputer 50 detects turning ON of the kill switch 100, so that energization from the gate drive 55 and the power module 54 to the motor 28 can be blocked off by the VTC microcomputer 50.

In addition, according to the present embodiment, even when the relay 101 is not mounted, energization to the motor 28 can be blocked off.

In other words, in the arrangement according to the present embodiment, when a motor-stop switch 102 is mounted, as shown in FIG. 6(b), the operation signal (speaking accurately, an OFF signal "0" which is an inverted signal) is transmitted to the gate of each transistor of the gate drive 55 directly in response to a turning ON operation of the motor stop switch 102 by the driver. Consequently, energization from the gate drive 55 and the power module 54 to the motor 28 can be blocked off.

In this arrangement, the driver can perform an emergency stopping operation of the motorcycle 1 without employing an expensive relay, and thus the total cost of the motorcycle 1 can be reduced.

In this arrangement according to the present embodiment, system ON/OFF signals from the main switch 44 can be transmitted to the gate drive 55 directly via the logical output unit 53. Therefore, it is also possible to control the signal transmitted from the logical output unit 53 to the gate of each transistor of the gate drive 55 to "0", and block off energization from the gate drive 55 and the power module 54 to the motor 28 by turning the main switch 44 ON and transmitting the inverted output ("0") to the logical output unit 53. In this case, the motor stop switch 102 is not necessarily required.

Subsequently, the pushing operation of the electric motorcycle 1 according to the present embodiment in a state of start waiting S2 will be described.

Figure 7:
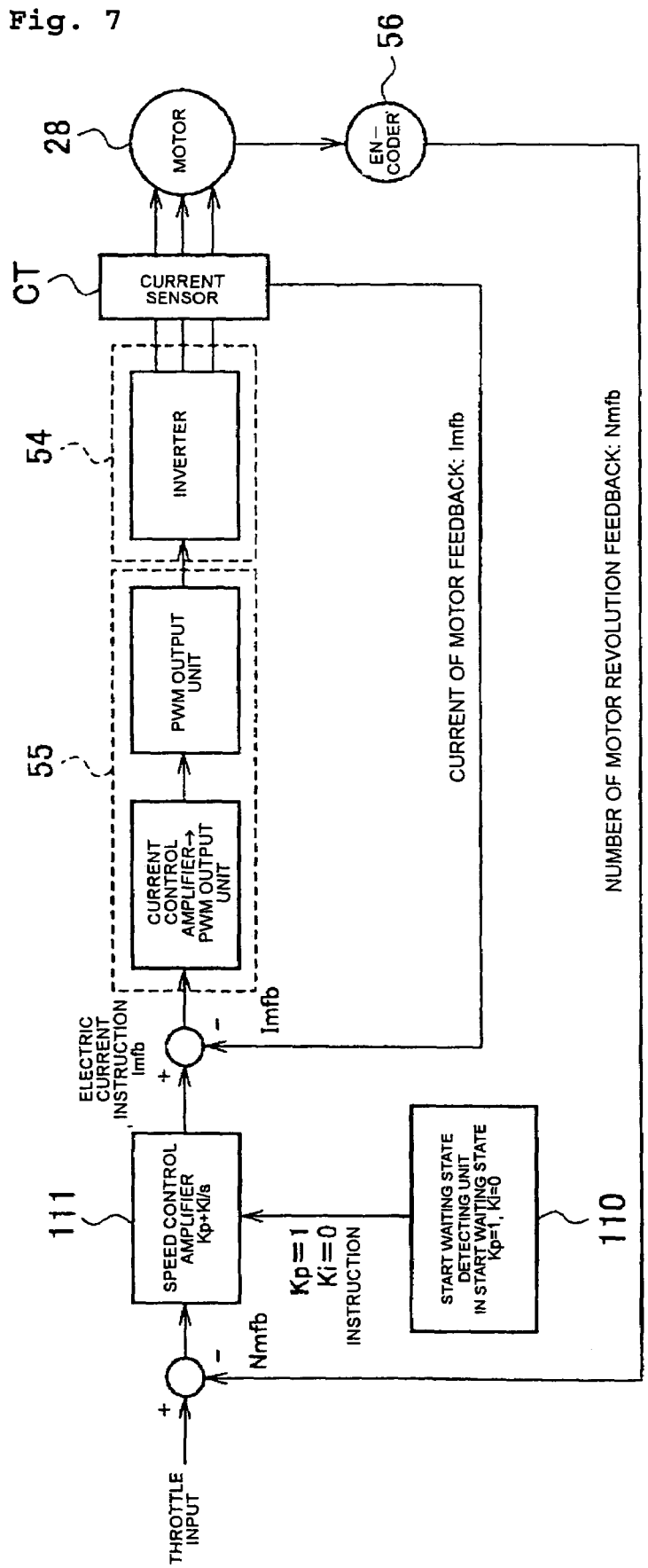
FIG. 7 is an explanatory drawing showing a pushing operation of the electric motorcycle which is in the start waiting state according to the present embodiment.

When the motorcycle 1 is in the start waiting state S2 as shown in the transfer state in FIG. 4, the VTC microcomputer 50 detects the start waiting state S2 with a function shown in a block (start waiting state detecting unit) 110 in FIG. 7 and, when this start waiting state is detected, the block 110 outputs coefficients Kp=1, Ki=0 to a block (speed control amplifier) 111 in FIG. 7. Then, the block 111 assign Kp=1, Ki=0 to the coefficients in a transfer function (Kp+Ki/s) of a feedback control system, and the throttle input from the throttle unit 46 is output as a vehicle current speed instruction value Imfb as is. Consequently, a speed control system which controls the speed to substantially the same speed as the walking speed with the throttle fully opened is constructed.

Subsequently, a switching determination process regarding the communication equipment connecting action of the electric motorcycle 1 according to the present embodiment will be described.

When abnormalities occur in the system of the electric motorcycle 1, the VTC microcomputer 50 stores data of the motorcycle 1 under such abnormal condition in a memory in the VTC microcomputer 50, and displays it via the meter 8 as needed.

In this case, data indicating the abnormal state stored in the memory of the VTC microcomputer 50 can be transmitted to the communication equipment by connecting communication equipment having a protocol which differs from the protocol of the meter microcomputer 38 to the communication path L2 between the VTC microcomputer 50 and other microcomputers (such as meter microcomputer 38) with a coupler or the like.

In this case, the VTC microcomputer 50 determines the switching in accordance with the protocol. In other words, the VTC microcomputer 50 transmits a signal indicating the protocol of the meter to the meter microcomputer 38 and waits for a response from the meter microcomputer 38. Then, when no response is received, it transmits a signal having the protocol of the communication equipment and waits for the response from the communication equipment.

BY repeating the above-described protocol determination process, whether or not the meter microcomputer 38 is connected to the VTC microcomputer 50 can easily be determined.

Subsequently, the process performed when the electric motorcycle 1 according to the present embodiment is transferred from the activation waiting state S2 to the travelable state S5 will be described.

As shown in FIG. 4, the VTC microcomputer 50 of the electric motorcycle 1 does not transfer immediately to the travelable state even when the main switch 44 is turned ON in the start waiting state S2, but it is brought into the travelable state S5 by some actions performed subsequently (for example, when one of the plurality of switches on the meter 8 is operated).

In addition, in the present embodiment, since the throttle unit 49 is constructed into a dual-system of the potentiometer 48 and the completely closing switch 46 as shown in FIG. 2, it is also possible to allow transfer to the travelable state S5 only when the driver turns the throttle to the completely closed position once to turn the completely closing switch 46 ON from the start waiting state S2, and the potential difference value transmitted from the potentiometer 48 is included within the range of the completely closed state, whereby further reliable travel is enabled.

Figure 8:
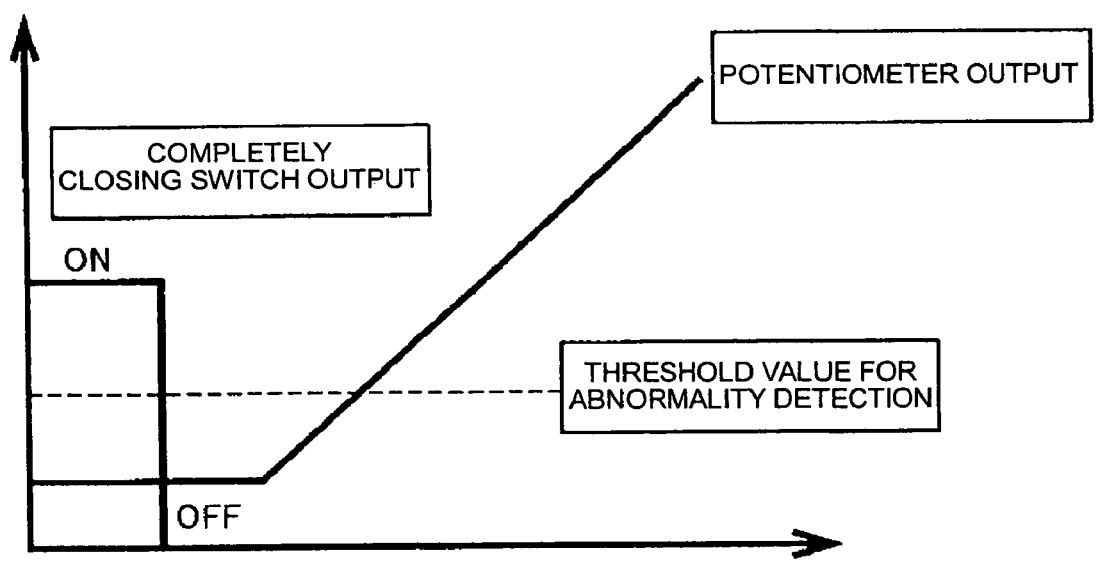
FIG. 8 is an explanatory drawing illustrating a process of detecting fixation of a potentiometer at a throttle unit according to the present embodiment.

In particular, according to the present embodiment, the throttle unit 49 is constructed into a dual-system of the potentiometer 48 and the completely closing switch 46. Therefore, abnormalities of the potentiometer 48 (for example, fixation due to freezing or the like) can be detected if the potential difference value of the potentiometer 48 exceeds a threshold value for the abnormality detection as shown in FIG. 8 when the completely closing switch 46 is turned from ON to OFF.

In the present embodiment when the VTC microcomputer 50 detects an abnormality (the state S4), the state of abnormalities can be display on the meter 8 via the meter microcomputer 38. In addition, according to the present embodiment, in a state of being charged (the state transition S3), the quantity of the battery in a state of being charged can be displayed on the meter 8 via the meter microcomputer 38, and also on the remaining quantity display LED 60 of the battery box 14.

Subsequently, the anti-theft function of the electric motorcycle 1 according to the present embodiment will be described.

For example, in a state in which the vehicle stops during travel, the driver inputs a personal identification number through a plurality of switches on the input unit of the meter (display control unit) 8. The input personal identification number is transmitted to the VTC microcomputer 50 via the meter microcomputer 38, and stored in the memory of the VTC microcomputer 50.

In this manner, when the personal identification number is set and stored in the VTC microcomputer 50, the state of the electric motorcycle 1 (VTC microcomputer 50) is transferred to the anti-theft state S6. Therefore, even when the operation for transferring from the start waiting state S2 to the above-described travelable state S5, for example, is performed by the driver, the vehicle is not transferred to the travelable state S5 unless the personal identification number is input through the plurality of switches on the input unit. The VTC microcomputer 50 then determines that the input personal identification number and the personal identification number stored in the memory are identical (release of anti-theft mode), and the vehicle is transferred to the start waiting state S2.

As a consequence, riding of a third party who does not know the personal identification number of the electric motorcycle 1 is prevented.

Even when the meter 8 is replaced, since the personal identification number is stored in the VTC microcomputer 50, a system in which the personal identification number cannot be cleared is achieved.

Subsequently, a traveling function in case of the BMC failure in the electric motorcycle 1 according to the present embodiment will be described.

In the present embodiment, the dischargeable limit of the battery 14a is detected by the BMC microcomputer 35.

In other words, the BMC microcomputer 35 compares the preset lower limit value of the battery voltage and the current battery voltage and determines that electric discharge is terminated when the current battery voltage is lower than the lower limit value.

In this case, according to the present embodiment, since the battery voltage value is detected also by the VTC microcomputer 50, comparison between the preset lower limit value of the battery voltage and the current battery voltage to determine termination of electric discharge by the VTC microcomputer 50 in case of the BMC microcomputer 35 failure.

In this manner, even in the case of the BMC microcomputer 35 failure, termination of electric discharge can be determined by the use of the battery voltage detecting function of the VTC microcomputer 50 without damaging the battery, and thus the vehicle can travel until the termination of the electric discharge.

Subsequently, the process regarding idle alarm sound and turning off of the idle alarm sound by braking in the electric motorcycle 1 in the present embodiment will be described.

The VTC microcomputer 50 does not generate an engine idle sound when the vehicle transfers from the start waiting state S2 to the travelable state S5.

In order to avoid such a phenomenon, the VTC microcomputer 50 generates an idle alarm sound automatically via the display control unit 8 or the like only when the vehicle is in the travelable state S5, and stops, and the throttle of the throttle unit 49 is completely closed.

The driver can turn the idle alarm sound off by gripping the brake, so that generation of unintended alarm sound may be prevented.

The blinking of a winker can be also realized by an electronic buzzer via the display control unit 8.

Subsequently, a capacity learning function of the electric motorcycle 1 in the present embodiment will be described.

The BMC controller 35 of the electric motorcycle 1 in the present embodiment, being normally in a sleeping state (low power consumption state), is driven by the VTC controller 50 or the like at predetermined intervals, and accumulates the quantity of electric discharge (quantity of electric discharge during usage, and quantity of self discharge), which is observed as a capacity learning value.

However, when abnormalities occur in the communication path L1 between the BMC microcomputer 35 and the VTC microcomputer 50, the VTC microcomputer 50 will have difficulty to activate the BMC microcomputer 35.

In this case, the BMC microcomputer 35 can detect and accumulate a discharging current, which cannot be detected normally, to minimize the accumulation error by detecting the presence of a flowing current and activating automatically, or by activating at regular intervals.

In case of the communication path failure, the BMC microcomputer 35 can prohibit the capacity learning to prevent an error from being entered in the learned value.

In this case, prohibition of the capacity learning is stored and continued until the normal electric charge terminates, and then is released upon normal termination of electric charge, so that the capacity learning is restarted.

In the embodiment described above, the case of being mounted on an electric motorcycle has been described. However, the present invention is not limited thereto, and other electric vehicles may be employed.

As described above, according to the present invention, owing to the mutual activating unit for the first controller and the second controller, one controller can activate/stop the other controller via the first communication path for communication between those controllers in response to activation of itself. Therefore, the system of the electric vehicle can be activated/stopped in a simple construction.

According to the construction described above, there is provided the first power source control circuit, the second power source control circuit, and the third power source control circuit independently of the first controller, the second controller, and the fourth controller. Therefore, it is not necessary to keep each controller in a waiting state. Consequently, power consumption can be reduced, and reliability may be improved.

According to the construction described above, the first communication path between the first controller and the second controller is constructed as a shared path that can be used for communicating an activation signal from one controller to the other controller together with a signal indicating information on the vehicle and the battery. Therefore, the system construction can be simplified.

In addition, according to the construction described above, an activation/stopping operation in response to the activation/stopping operation and starting/termination of charging by the operation of the main switch can be realized in a simple structure, respectively.

What is claimed is:

1. An electric vehicle comprising:
   a motor;
   a first controller that controls the motor;
   a chargeable battery supplying electric power to the motor;
   a second controller connected to the battery that controls electric charge for the battery and electric discharge from the battery; and
   a first communication path that communicates between the first controller and the second controller,
   wherein the first controller includes a first power source that operates and stops the first controller and a first power source control circuit that turns ON and OFF the power source, the first communication path includes a first path for connecting the second controller and the first power source control circuit, the second controller transmits an activation signal to the first power source control circuit via the first path when electric charging to the battery starts in a state in which the first controller has not been activated, and the first controller is adapted to start by a turning-ON operation of the first power source by the first power source control circuit in response to the transmitted activation signal;
   a battery charger, brought into and out of electrical contact with the battery and the second controller, the battery charger charges the battery in a state of being electrically connected to the battery and the second controller;
   the battery charger includes a third controller for controlling an output current and/or an output voltage during a charging operation of the battery charger, and
   a second communication path that communicates between the second controller and the third controller,
   wherein the second controller includes a second power source that operates and stops the second controller and a second power source control circuit that turns ON and OFF the second power source, the second communication path includes a second path that connects the third controller and the second power source control circuit, the third controller transmits an activation signal to the second power source control circuit via the second path when the battery charger is electrically connected to the battery in a state in which the second controller has not been activated, and the second controller starts by a turning-ON operation of the second power source by the second power source control circuit in response to the transmitted activation signal.

2. The electric vehicle according to claim 1, wherein the third controller transmits a stop signal to the second power source control circuit via the second path when the battery charger is electrically disconnected from the battery when the first and the second controllers are activated,
   the second controller stops activating by a turning-OFF operation of the second power source by the second power source control circuit in response to the transmitted stop signal,
   the first power source control circuit turns OFF 1 he first power source in response to the stop of activation of the second controller and/or an activation stopping signal transmitted from the second controller, and
   the first controller stops activation by a turning-OFF operation of the first power source.

3. The electric vehicle according to claim 1, further comprising:
   a display unit that displays the charged state of the battery;
   a fourth controller that controls the displaying mode of the display unit; and
   a third communication path that communicates between the first controller and the fourth controller,
   the fourth controller includes a third power source that operates the controller and a third power source control circuit that turns ON and OFF the third power source,
   the third communication path includes a third path that connects the first controller and the third power source control circuit,
   wherein the first controller transmits an activation signal to the third power source control circuit via the third path in response to the activation of the first controller in a state in which the fourth controller is not activated, and the fourth controller is activated by a turning-ON operation of the third power source by the third power source control circuit in response to the transmitted activation signal.

4. The electric vehicle according to claim 1, wherein the first communication path includes a fourth path that connects the first controller and the second power source control circuit, the first controller transmits the activation signal to the second power source control circuit via the fourth path in response to the activation of the first controller in a state in which the second controller is not activated, and the second controller is activated, by the turning-ON operation of the second power source by the second power source control circuit in response to the transmitted activation signal.

5. The electric vehicle according to claim 1, further comprising a main switch connected to the first controller and being turned ON and OFF, wherein the first controller is activated by a turning-ON operation of the main switch and stops operation by the turning-OFF operation of the main switch.

6. The electric vehicle according to claim 2, further comprising:
a display unit that displays the charged state of the battery;
a fourth controller that controls the displaying mode of the display unit; and
a third communication path that communicates between the first controller and the fourth controller,
the fourth controller includes a third power source that operates the controller and a third power source control circuit that turns ON and OFF the third power source,
the third communication path includes a third path that connects the first controller and the third power source control circuit,
wherein the first controller transmits an activation signal to the third power source control circuit via the third path in response to the activation of the first controller in a state in which the fourth controller is not activated, and the fourth controller is activated by a turning-ON operation of the third power source by the third power source control circuit in response to the transmitted activation signal.

7. The electric vehicle according to claim 2, wherein the first communication path includes a fourth path that connects the first controller and the second power source control circuit, the first controller transmits the activation signal to the second power source control circuit via the fourth path in response to the activation of the first controller in a state in which the second controller is not activated, and the second controller is activated by the turning-ON operation of the second power source by the second power source control circuit in response to the transmitted activation signal.

8. The electric vehicle according to claim 2, further comprising a main switch connected to the first controller and being turned ON and OFF, wherein the first controller is activated by a turning-ON operation of the main switch and stops operation by the turning-OFF operation of the main switch.

9. The electric vehicle according to claim 3, wherein the first communication path includes a fourth path that connects the first controller and the second power source control circuit, the first controller transmits the activation signal to the second power source control circuit via the fourth path in response to the activation of the first controller in a state in which the second controller is not activated, and the second controller is activated by the turning-ON operation of the second power source by the second power source control circuit in response to the transmitted activation signal.

10. The electric vehicle according to claim 3, further comprising a main switch connected to the first controller and being turned ON and OFF, wherein the first controller is activated by a turning-ON operation of the main switch and stops operation by the turning-OFF operation of the main switch.

11. The electric vehicle according to claim 4, further comprising the main switch connected to the first controller and being turned ON and OFF, wherein the first controller is activated by a turning ON operation of a main switch, the activated first controller transmits an activation signal to the second power control circuit via the fourth path, and the second controller is activated by the turning ON operation of the second power source by the second power source control circuit in response to the transmitted activation signal,
the first controller shifts the operation mode of the first controller to a charging mode when the battery charger is electrically connected to the battery with the main switch turned ON and stops operation when the battery charger is electrically disconnected from the battery.

12. The electric vehicle according to claim 4, wherein the first path is a common path through which a signal indicating information about the vehicle and the battery passes together with the activation signal.

13. The electric vehicle according to claim 4, further comprising a main switch connected to the first controller and being turned ON and OFF, wherein the first controller is activated by a turning-ON operation of the main switch and stops operation by the turning-OFF operation of the main switch.

* * * * *